Sept. 17, 1946. C. H. DOLAN, 2D 2,407,819
POTATO PEELER
Filed Feb. 9, 1945 2 Sheets-Sheet 1

CHARLES H. DOLAN, II
INVENTOR.

BY *John P. Nixonow*

ATTORNEY

Sept. 17, 1946.　　　C. H. DOLAN, 2D　　　2,407,819
POTATO PEELER
Filed Feb. 9, 1945　　　2 Sheets-Sheet 2
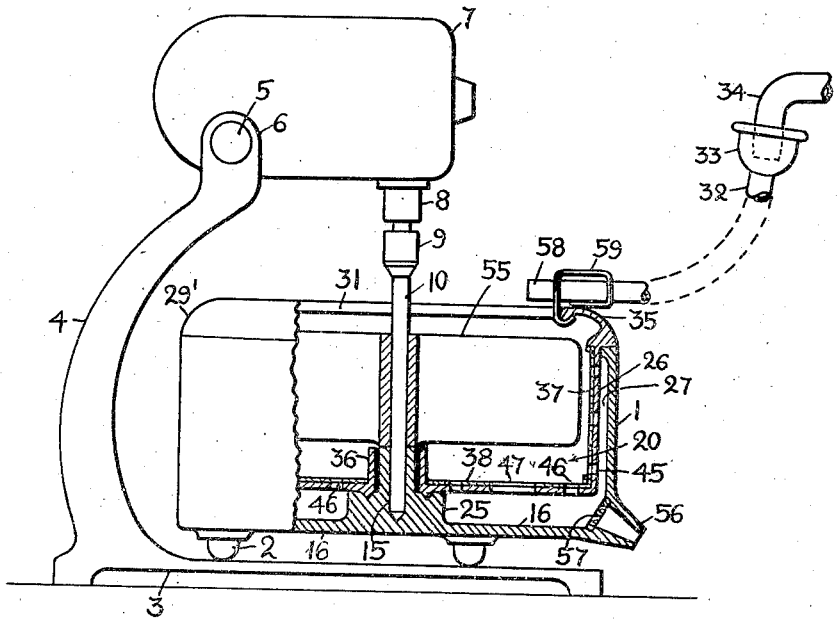
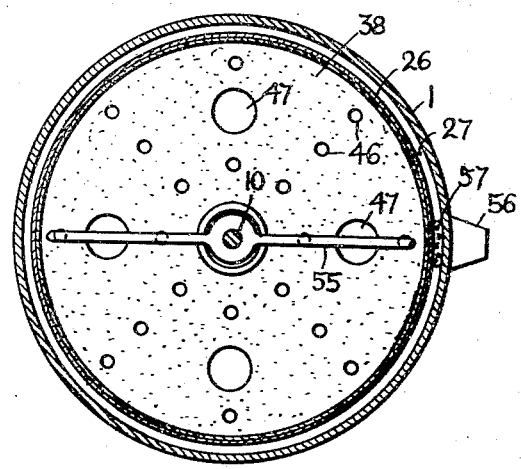
CHARLES H. DOLAN, II
INVENTOR.
BY John P. Nikonow
ATTORNEY Patented Sept. 17, 1946

2,407,819

UNITED STATES PATENT OFFICE 2,407,819

POTATO PEELER

Charles H. Dolan, II, Old Greenwich, Conn.

Application February 9, 1945, Serial No. 576,991

7 Claims. (Cl. 146—50)

My invention relates to potato peelers and has particular reference to machines or devices operated by electric motors for peeling potatoes and other vegetables and fruit.

My invention has for its object to provide a simple and compact portable device for peeling potatoes, fruit and other vegetables, which can be operated by a small electric motor, preferably forming a part of a conventional household appliance such as an egg beater or mixer. Such appliances are usually provided with a small motor, pivotally supported on a bracket at an elevation over a base on which a vessel is placed, containing a liquid or substance to be mixed or stirred. My device is so arranged and designed that it can be placed on the base of such an electric mixer, the shaft of my device being arranged to be conveniently coupled by a quick detachable coupling to the end of the motor shaft.

Another object of my invention is to provide means to peel potatoes and other vegetables or fruits by subjecting them to the rubbing and scraping action of a rotary brush and stationary abrading surfaces. I have found that satisfactory results are obtained when potatoes are rubbed against the walls of a container which are covered with a lining made of sandpaper or similar abrasive material. The lining being preferably removable and replaceable.

In a modified device I provide a paddle for moving the potatoes in a bowl whose walls are lined with sandpaper.

Still another object of my invention is to provide a potato peeler in which the peelings can be continuously removed from the container by a stream of water, leaving the peeled potatoes clean from the scraped off skin.

My invention is more fully described in the accompanying specification and drawings in which:

Fig. 3 is a sectional elevational view of a modified potato peeler; and

Fig. 4 is a sectional plan view of the same.

Figure 1:
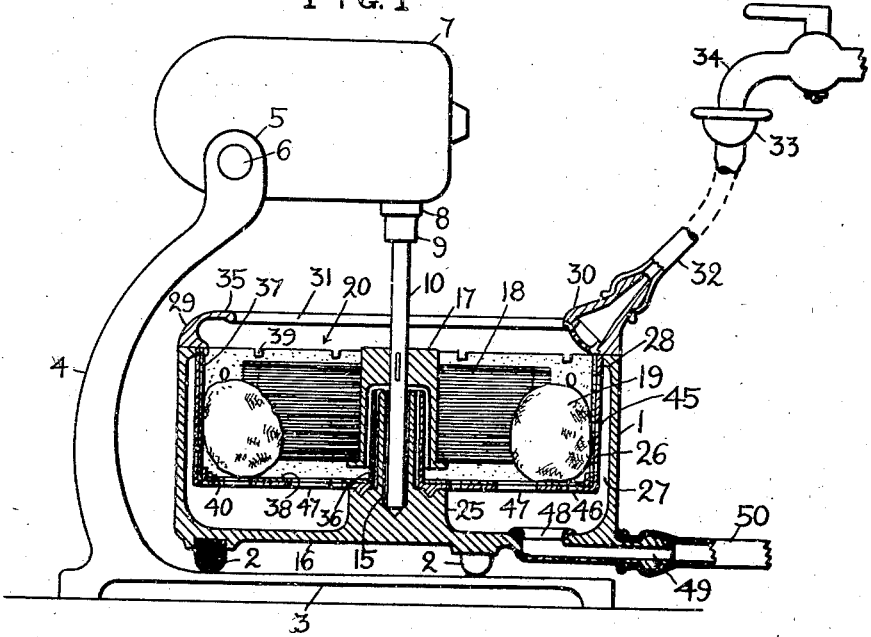
Fig. 1 is a sectional elevational view of my potato peeler.
Figure 2:
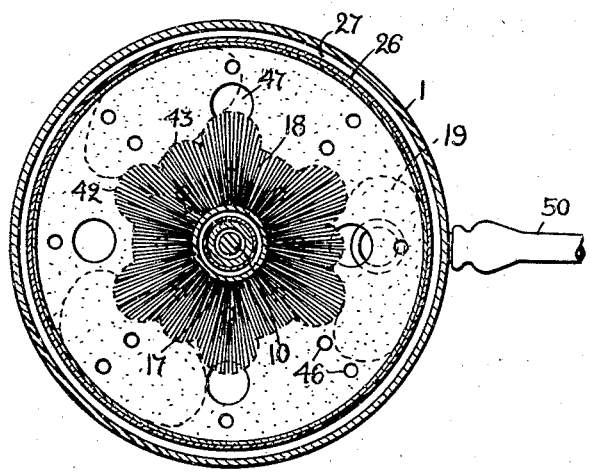
Fig. 2 is a sectional plan view.

My potato peeler as shown in Figs. 1 and 2 consists of an outer cylindrical bowl 1 having rubber feet 2, resting on a base 3 of an electric mixer of a conventional or other type, the mixer comprising a bracket 4 with bearing 5 for trunnions 6 of an electric motor 7. The latter is geared to a vertical shaft 8 with a coupling 9 for connecting the driving shaft 8 to a shaft 10 of the potato peeler. The lower portion of the shaft 10 is journaled in a vertical thrust bearing 15 at a bottom plate 16 of the bowl 1. A hub 17 is secured on the shaft 10 and is provided with radially extending bristles of a cylindrical brush 18. The bristles are preferably made of thin resilient wires with sharp ends for scraping and removing the skin from potatoes 19 or other vegetables and fruit. The potatoes are placed in an inner bowl 20 which is supported on a central boss 25 at the bottom of the outer bowl 1. The walls 26 of the inner bowl extend upward parallel to the walls of the bowl 1 and at a distance therefrom, forming a clearance 27. The upper edges of the walls 26 fit snugly against an inward extending flange 28 of the outer walls, covered by an annular lid 29 with a large central opening 31 through which the potatoes are placed in the inner bowl. A nozzle 30 is provided on the lid 29 with a rubber hose 32, the other end of the hose having a rubber socket 33 for attaching the hose to the end of a faucet 34 of a water supply pipe. An overhanging flange 35 of the lid 29 prevents the water splashes from escaping from the bowl. The bottom wall of the inner bowl is provided with a tubular extension 36 for protecting the bearing 15 from the water in the bowl.

The inner bowl is provided inside with a lining 37, 38 preferably made of waterproofed sandpaper or emery cloth. The upper edges of the sandpaper 37 are retained by small clips 39 extending from the inner edges of the lid 29. A metal ring 40 may be provided for retaining the sandpaper. The latter may be also secured by a waterproof cement, preferably of a non-drying type.

The periphery of the rotary brush 18 is trimmed to provide scalloped projections 42, 43. The projections are spaced from the walls of the inner bowl to provide room for the potatoes. The latter are moved around and rotated by the projections, causing the potatoes to be rubbed against the sandpaper lining 37, 38. The bristles of the brush are resiliently deflected by the potatoes in different directions, thereby increasing the rubbing effect on the potato skins.

The vertical walls of the inner bowl and of the sandpaper 37 are provided with holes 45 for allowing the water sprays to escape into the space 27. The bottom plate 16 of the inner bowl is provided with holes 46 for the water and also with larger holes 47 for scrapings and pieces of the potato skin, carried by the escaping water.

A drain opening 48 is provided in the bottom plate of the outer bowl with a tubular extension 49 to which a drain hose 50 is attached.

The cleaned potatoes can be removed from the inner bowl without removing the lid 29, through the opening 31 and new potatoes placed in the bowl to be cleaned, so that a large number of potatoes can be cleaned in a relatively short time, all the work being performed on a kitchen table, the hose 32 being connected to an ordinary water faucet, and the drain hose 50 may be placed in a sink or other receptacle.

The potato peeler can be quickly and easily removed from its place on the base 3 by disconnecting the coupling 9 and turning the motor 7 upward on its trunnions.

The inner bowl can be removed for cleaning or for replacing the sandpaper, by removing the lid 29 and the shaft 10 with the brush 18. The inner bowl 10 will be then free to be lifted from its place.

For certain purposes the brush 18 may be replaced by a paddle 55 on the shaft 10 as shown in Figs. 3 and 4. Such a paddle is particularly useful when it is desired to peel relatively soft fruit or vegetables or when it is desired to remove a very thin outer layer only. The drain nozzle 49 may be replaced by a short spout 56 with a perforated plate or screen 57 for preventing the escape of larger pieces of peelings or skin.

The lid 29' may be provided with a removable nozzle 58 for the water hose 32, the nozzle being held on the flange 35 of the lid 29' by a resilient clip 59.

My device has an important advantage of being relatively small and portable so that it can be conveniently handled, for instance, by a housewife, and does not require any special motor or other source of power, an ordinary drink mixer with its motor being sufficient to operate my device. Another advantage resides in the simplicity of the device, so that it can be easily taken apart and cleaned. Despite its miniature size, however, the device is amply sufficient for its needs for an average family.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A potato peeler comprising an outer cylindrical bowl open at the top and having a bottom plate; an upward extending projection on the bottom plate; a vertical shaft rotatively supported at its lower end in the projection, the upper end of the shaft being free and arranged to be connected to a source of power for its rotation; an inner bowl having cylindrical walls and a bottom plate removably supported in the outer bowl, the walls and the bottom plate of the inner bowl being spaced from the walls and the bottom plate of the outer bowl, and provided with drain holes; an inward extending flange at the upper edge of the outer bowl engaging the upper edge of the inner bowl; a lid removably supported on the upper edges of the bowls and provided with a large opening for admitting vegetables into the inner bowl; means on the shaft to rotate the vegetables in the inner bowl; and means on the walls and on the bottom plate of the inner bowl for removing the outer layers of the vegetables.

2. A potato peeler comprising an outer cylindrical bowl open at one end and having a bottom plate; a shaft rotatively supported in the bottom plate, the outer end of the shaft being arranged to be connected with a source of power for its rotation; an inner bowl having cylindrical walls open at one end and closed by a bottom plate at the other end, the walls and the bottom plate of the inner bowl being spaced from the walls and from the bottom plate of the outer bowl and provided with drain holes; means to admit water into the inner bowl, the inner bowl being adapted to receive vegetables to be peeled; means on the shaft for moving the vegetables around in the inner bowl; and sheets of an abrading material removably supported on the inner surface of the inner bowl for abrading the vegetables, the outer bowl having an opening for draining the water.

3. A potato peeler comprising an outer cylindrical bowl open at one end and having a bottom plate; a shaft rotatively supported in the bottom plate, the outer end of the shaft being arranged to be connected with a source of power for its rotation; an inner bowl having cylindrical walls open at one end and closed by a bottom plate at the other end, the walls and the bottom plate of the inner bowl being spaced from the walls and from the bottom plate of the outer bowl and provided with drain holes; means to admit water into the inner bowl, the inner bowl being adapted to receive vegetables to be peeled; means on the shaft for moving the vegetables around in the inner bowl; means on the inner surface of the inner bowl for abrading the vegetables, the outer bowl having an opening for draining the water; and means to removably support abrading sheet material on the inner surfaces of the inner bowl, the sheet material being provided with holes registering with the holes in the walls and bottom plate of the inner bowl.

4. A potato peeler comprising an outer cylindrical bowl open at the top and having a bottom plate; an upward extending projection on the bottom plate; a vertical shaft rotatively supported at its lower end in the projection, the upper end of the shaft being free and arranged to be connected to a source of power for its rotation; an inner bowl having cylindrical walls and a bottom plate supported in the outer bowl, the walls and the bottom plate of the inner bowl being provided with drain holes; means to admit water to the inner bowl; means to conduct the used water from the outer bowl; the inner bowl being adapted to receive vegetables to be peeled; means on the shaft for rotatively moving the vegetables in the inner bowl; and means on the walls of the inner bowl for abrading the skin of the vegetables, the inner bowl having a central tubular projection extending upward concentrically with the shaft and surrounding the shaft.

5. A potato peeler comprising an outer cylindrical bowl open at the top and having a bottom plate; an upward extending projection on the bottom plate; a vertical shaft rotatively supported at its lower end in the projection, the upper end of the shaft being free and arranged to be connected to a source of power for its rotation; an inner bowl having cylindrical walls and a bottom plate; a lid removably supported at the open end of the outer bowl having an opening for admitting vegetables to be peeled into the inner bowl; a nozzle formed integrally with the lid directed into the inner bowl adapted to be connected with a rubber hose; a drainage pipe integrally formed with the bottom plate of the outer bowl adapted to be connected to a rubber hose; means on the shaft for rotating the vegetables in the inner bowl; and means at the walls of the inner bowl for scraping the skin off the vegetables when the vegetables are rotated.

6. A potato peeler comprising an outer cylindrical bowl open at one end and having a bottom plate; a shaft rotatively supported in the bottom plate, the outer end of the shaft being arranged to be connected with a source of power for its rotation; an inner bowl having cylindrical walls open at one end and closed by a bottom plate at the other end, the walls and the bottom plate of the inner bowl being spaced from the walls and from the bottom plate of the outer bowl and provided with drain holes; means to admit water into the inner bowl, the inner bowl being adapted to receive vegetables to be peeled; a paddle on the shaft for moving the vegetables around in the inner bowl; and sheets of a waterproof abrasive material removably supported at the inner surfaces of the inner bowl.

7. A potato peeler comprising an outer cylindrical bowl open at one end and having a bottom plate; a shaft rotatively supported in the bottom plate, the outer end of the shaft being arranged to be connected with a source of power for its rotation; an inner bowl having cylindrical walls open at one end and closed by a bottom plate at the other end, the walls and the bottom plate of the inner bowl being spaced from the walls and from the bottom plate of the outer bowl and provided with drain holes; means to admit water into the inner bowl, the inner bowl being adapted to receive vegetables to be peeled; a hub on the shaft; a brush having bristles radially extending from the hub, the peripheral portions of the brush being spaced from the walls of the inner bowl to provide room for the vegetables, the brush having scalloped projections at the periphery; and means at the inner surfaces of the inner bowl for scraping the skins off the vegetables.

CHARLES H. DOLAN, II.